June 17, 1930.  O. C. KREIS  1,764,734
INTERNAL COMBUSTION ENGINE
Filed Jan. 30, 1928   2 Sheets-Sheet 1
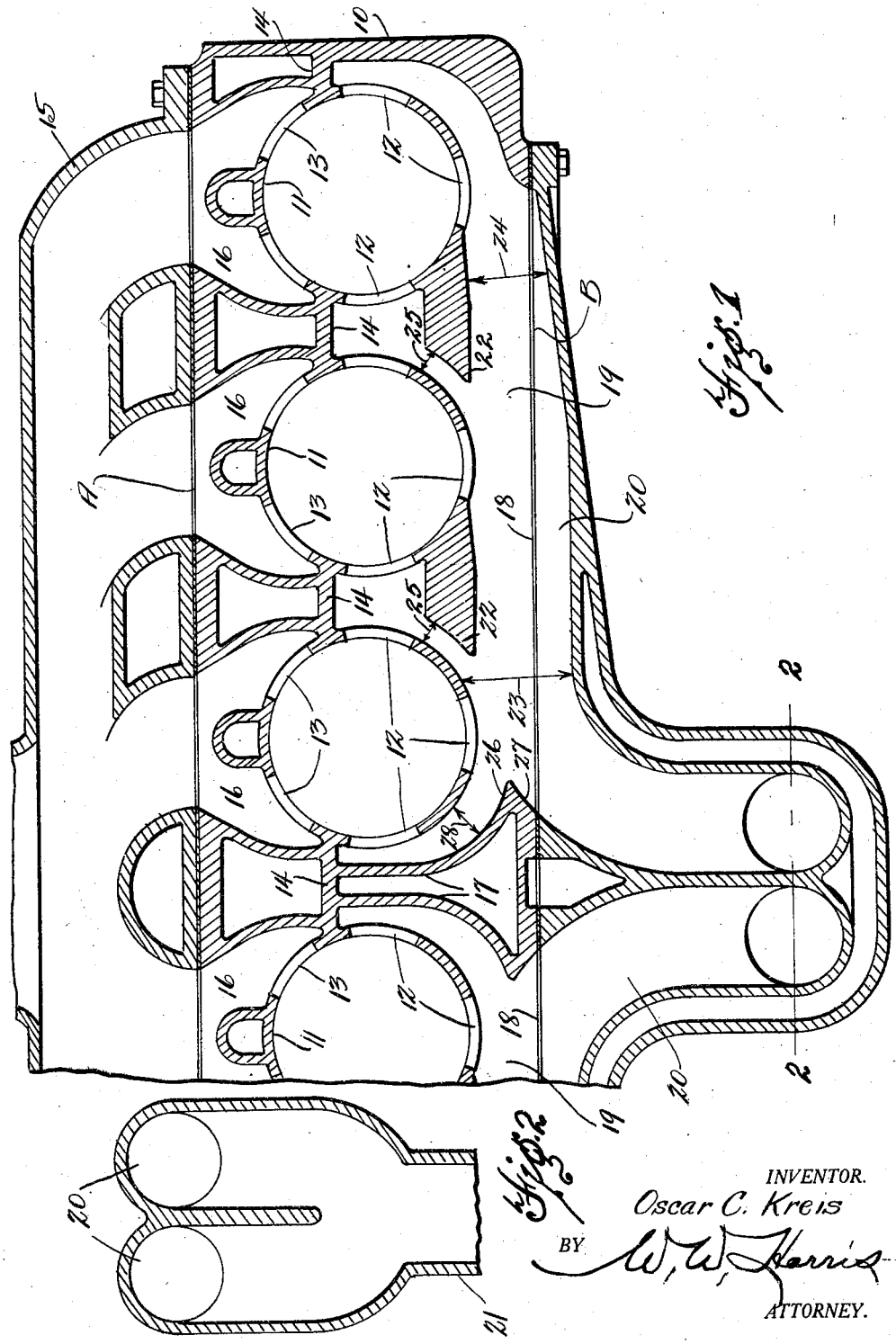
INVENTOR.
Oscar C. Kreis
BY W. W. Harris
ATTORNEY.

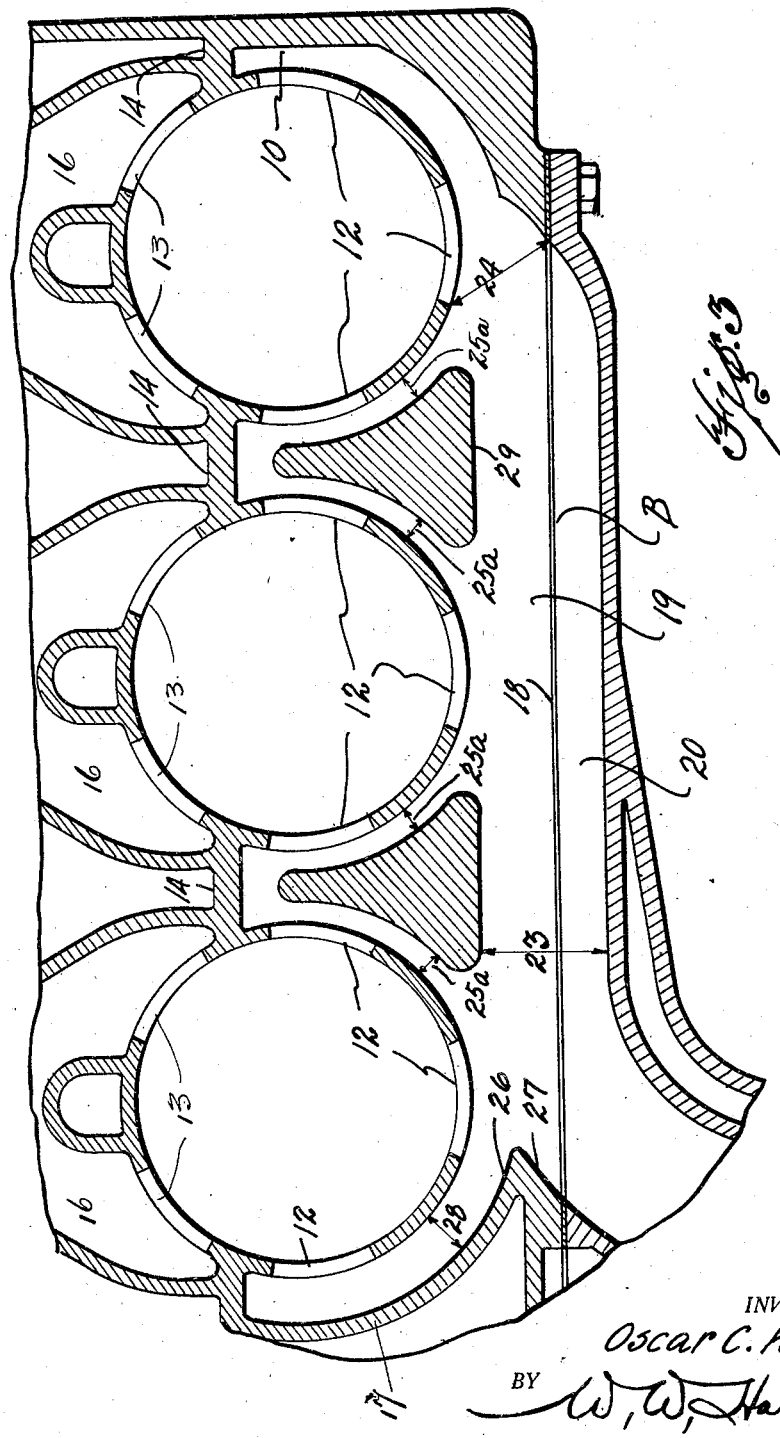

Patented June 17, 1930

1,764,734

UNITED STATES PATENT OFFICE

OSCAR C. KREIS, OF DETROIT, MICHIGAN, ASSIGNOR TO CONTINENTAL MOTORS CORPORATION, OF DETROIT, MICHIGAN, A CORPORATION OF VIRGINIA

INTERNAL-COMBUSTION ENGINE

Application filed January 30, 1928. Serial No. 250,354.

This invention relates to internal combustion engines and refers more particularly to the sleeve valve and other like types of engines.

One object of my invention resides in the provision of improved means for the distribution of the fuel mixture to the engine cylinders. Heretofore it has been customary in sleeve valve and like engines having multiple cylinders to group the cylinders for manifolding purposes, each cylinder group having a cylinder block intake chamber cooperating with the intake manifold system to supply fuel mixture to the cylinder intake ports for each group. In such prior constructions the fuel mixture was generally conducted to the intake chambers by an intake manifold, the gases being confined in pipes and distributed for passage to the intake chambers in a generally efficient manner, but on reaching the intake chambers the intake gases were distributed to the cylinder intake ports without being efficiently confined and distributed. I have provided an intake chamber and manifold construction which provides for efficient passage of the intake gases to the cylinder intake ports, the cross-sectional areas of the passages leading to the cylinder intake ports being substantially in accordance with the intake port requirements. In this manner each intake port is efficiently supplied with fuel mixture preventing "starving" of any cylinder or intake ports thereof, avoiding undue gas eddies in the intake chamber and generally increasing the efficiency and smooth running qualities of the engine.

A further object of my invention resides in the provision of a novel arrangement for grouping the engine cylinders for obtaining an improved distribution of the fuel mixture to the various cylinders.

Referring to the accompanying drawings,

Fig. 1 illustrates a plan sectional view of a portion of my engine, the section being taken through the cylinder block chamber conduits and cylinder ports, Fig. 2 is a detail view through 2—2 of Fig. 1, and Fig. 3 is a view corresponding to Fig. 1, illustrating a modification of my invention.

In the drawings reference character 10 represents the engine cylinder block having a plurality of aligned cylinders 11. The engine illustrated is one of the sleeve valve type in which one or more sleeve valves (not shown) are moved generally within the cylinders, the sleeve or sleeves having ports cooperating with the cylinder intake and exhaust ports 12 and 13 respectively. The cylinder block is formed with wall portions 14 serving to connect adjacent cylinders longitudinally, thus dividing the cylinder block 10 into intake and exhaust sides A and B respectively. The exhaust gases from ports 13 may be conducted to an exhaust manifold 15 in any desired manner as by the cylinder block exhaust chambers 16. My invention has particular reference to the intake side of the engine.

My invention is illustrated in connection with a six cylinder engine of the single sleeve valve "Burt-McCollum" type in which a single sleeve valve for each cylinder is driven with a combined reciprocating and oscillating movement as well known in the art. The engine illustrated is grouped for intake gas distribution into two groups of three cylinders each, by a transverse wall 17. It will be understood that the three cylinders and general construction to the left of the central wall 17 is the same as the three cylinders illustrated to the right of the wall, it being deemed necessary to only show a portion of the engine.

The cylinder block 10 has a pair of longitudinally extending openings 18 along the intake side of the block for the introduction of the fuel mixture to the respective cylinder groups. The cylinder block 10 with the wall 14, 17 and cylinders 11 form cylinder block intake chambers 19 respectively communicating with the ports 12 of the cylinder groups aforesaid. The chambers 16, 19 are bounded by upper and lower floors or walls transversely of the cylinder block as will be understood. The openings 18 of the intake chambers register with corresponding openings of the branches 20 of intake manifold 21, the manifold branches 20 preferably registering substantially for their length with the openings 18 providing for minimum transverse dimension of the cylinder block.

With the view of efficiently distributing the fuel mixture from manifold 21 to the ports 12 the cylinders in one form of my invention, have their walls formed with lateral projections 22 which constitute filler pieces in the intake chambers 19 and which cooperate with adjacent cylinders and branches 20 in providing intake chamber passages for the various ports 12 having their cross-sections substantially in accordance with the port requirements. Thus the cylinder walls are utilized as a portion of the manifold system keeping them "alive" in contrast with their otherwise inactive and detrimental tendencies. In conventional constructions the intake gas velocity and smooth flow is interrupted and partially destroyed at such points resulting in an inefficient distribution. With my construction the intake chamber is formed in a series of branched passages for the various ports, each of the branches affording proper fuel conducting capacity depending on the number of cylinder intake ports to be supplied. Furthermore a main manifold chamber conduit is obtained preferably decreasing in capacity, away from the source, as between the points 23, 24. The intake chamber branches 25 supplying the inner pairs of ports 12 of adjacent cylinders preferably has substantially the same capacity as at 28 since each supplies a single port 12, the conduit at 23 and 24 having a greater capacity to accommodate a greater number of ports as will be readily understood. The ports supplied by branches 25 function at different intervals in the engine cycle so that this branch supplies only a single port at any time. All of the ports of any cylinder are, of course, open at the same time.

The wall 17 is preferably flared longitudinally at 26 with a return flare 27 within the cylinder block for cooperation with the manifold branches 20 in obtaining the desired cross-sectional area at 23 without leaving too large a conduit 28 for the single port 12 adjacent the inner extremity of wall 17. The conduits 23, 24, 25, 28 have substantially the proportioned capacities for the number of intake ports 12 supplied by each. Beneficial results are also obtained by distributing the fuel mixture from substantially central points longitudinally of the cylinder block to the cylinder groups to each side thereof.

Referring to the modification illustrated in Fig. 3, instead of locating projections from the cylinder walls the space between adjacent cylinders is partially occupied by filler pieces 29 preferably arranged so that the branch conduits 25ª so formed have substantially the capacity for the single ports supplied. The fuel mixture flow to each innermost port 12 of adjacent cylinders having the cooperating filler pieces 29 will pass around each side of the filler piece from the main manifold chamber conduit. Thus the cylinder walls are kept "alive" and a "dead" pocket between adjacent cylinders at the walls 14 is prevented. The form of my invention shown in Fig. 3 has all of the aforesaid advantages incident to that illustrated in Fig. 1. As a still further modification the filler pieces 29 might connect the walls 14 in which instance they would be spaced farther from the adjacent cylinder walls as only one branch passage to each innermost port would be provided instead of two as in Fig. 3. Other modifications will suggest themselves within the spirit and scope of my invention.

While I have illustrated my invention in connection with a six cylinder engine of the sleeve valve type as aforesaid, the fundamental teachings of my invention may be readily utilized in engines having other numbers of cylinders and in engines of other port and sleeve valve types and arrangements as will be readily understood.

What I claim as my invention is:

1. An internal combustion engine of the sleeve valve type comprising in combination, a cylinder block having a plurality of engine cylinders laterally ported for passage of intake and exhaust gases, an intake chamber within the cylinder block communicating with the intake ports of and partially surrounding a plurality of the cylinders, an intake manifold communicating with the intake chamber, and filler means within said chamber providing an intake gas passage wall.

2. An internal combustion engine of the sleeve valve type comprising in combination, a cylinder block having a plurality of engine cylinders ported laterally for passage of intake and exhaust gases, an intake chamber within the cylinder block communicating with the intake ports of and partially surrounding a plurality of the cylinders, an intake manifold communicating with the intake chamber, one of said cylinders having associated therewith intake gas distributing means projecting into said chamber.

3. An internal combustion engine of the sleeve valve type comprising in combination, a cylinder block having a plurality of engine cylinders laterally ported for passage of intake and exhaust gases, an intake chamber within the cylinder block communicating with the intake ports of and partially surrounding a plurality of the cylinders, an intake manifold communicating with the intake chamber, one of said cylinders having a portion projecting into said chamber for cooperation with an adjacent cylinder to form therewith a fuel mixture passage.

4. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, means within said chamber cooperating with the wall of an adjacent cylinder and with the intake manifold to form therewith a fuel mixture passage.

5. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, said intake chamber being formed of a plurality of fuel conducting conduits between adjacent cylinders and longitudinally thereof for conducting intake gases to the cylinder intake ports, said conduits having their relative cross-sectional areas proportioned in accordance with intake port requirements.

6. An internal combustion engine of the sleeve valve type comprising in combination, a cylinder block having a plurality of engine cylinders ported for passage of intake and exhaust gases, an intake chamber communicating with the intake ports of a plurality of the cylinders, an intake manifold communicating with the intake chamber, said intake chamber including a main fuel mixture supply conduit and a passage branched from said conduit intermediate a pair of adjacent cylinders, one of said adjacent cylinders having a filler member associated therewith within the intake chamber where the said passage is branched from the said main conduit.

7. An internal combustion engine of the sleeve valve type comprising in combination, a cylinder block having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means, and an intake manifold having branched portions respectively communicating with said intake chamber portions adjacent the said intake chamber dividing means.

8. An internal combustion engine of the sleeve valve type comprising in combination, a cylinder block having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means and an intake manifold having branched portions respectively communicating with said intake chamber portions adjacent the said intake chamber dividing means, the respective intake chamber portions and the intake manifold branched portions together forming oppositely and longitudinally extending main fuel mixture conducting passages.

9. An internal combustion engine of the sleeve valve type comprising in combination, a cylinder clock having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means, an intake manifold having branched portions respectively communicating with said intake chamber portions adjacent the said intake chamber dividing means, the respective intake chamber portions and the intake manifold branched portions together forming oppositely and longitudinally extending main fuel mixture conducting passages, and branch supply passages communicating with the main passages generally transversely of the cylinder block intermediate adjacent cylinders.

10. An internal combustion engine of the sleeve valve type comprising in combination, a cylinder block having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means and an intake manifold having branched portions respectively communicating with said intake chamber portions adjacent the said intake chamber dividing means, the respective intake chamber portions and the intake manifold branched portions together forming oppositely and longitudinally extending main fuel mixture conducting passages, said main fuel conducting passages tapering toward the respective cylinder block ends.

11. An internal combustion engine of the sleeve valve type comprising in combination, a cylinder block having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means, an intake manifold having branched portions respectively communicating with said intake chamber portions adjacent the said intake chamber dividing means, the respective intake chamber portions and the intake manifold branched portions together forming oppositely and longitudinally extending main fuel mixture conducting passages, and branch supply passages generally transversely of the cylinder block intermediate adjacent cylinders, said main and branched passages having cross-sectional areas substantially throughout their lengths proportioned in accordance with the requirements of the cylinder intake ports in communication therewith.

12. An internal combustion engine of the sleeve valve type comprising in combination, a cylinder block having a plurality of engine cylinders ported for intake gases, said cylinder block provided with a pair of longitudinal side openings each opening extending substantially opposite groups of half the engine cylinders, cylinder block chambers communicating with said openings respectively and with the intake ports of the respective cylinder groups, and an intake manifold having branches respectively communicating with the said openings.

13. An internal combustion engine of the sleeve valve type comprising in combination, a cylinder block having a plurality of engine cylinders ported for intake gases, said cylinder block provided with a pair of longitudinal side openings each opening extending substantially opposite groups of half the engine cylinders, cylinder block chambers communicating with said openings respectively and with the intake ports of the respective cylinder groups, and an intake manifold having branches respectively communicating with the said openings opposite and adjacent the central pairs of cylinders.

14. An internal combustion engine of the sleeve valve type comprising in combination, a plurality of ported cylinders, a generally transverse cylinder block wall dividing adjacent cylinders, said wall having a flared portion projecting longitudinally of the cylinder block beyond the said wall and a return flared portion terminating at the side of the cylinder block, a cylinder block intake chamber communicating with the intake ports of a cylinder adjacent said wall and bounded by said wall and said wall portions, and an intake manifold structure communicating with the intake chamber adjacent the said return flared portion.

15. An internal combustion engine of the sleeve valve type comprising in combination, a cylinder block having a plurality of engine cylinders ported for passage of intake and exhaust gases, means dividing opposite sides of the cylinder block into intake and exhaust chambers, said intake chamber communicating with the intake ports of a plurality of the cylinders, an intake manifold communicating with the intake chamber, and a filler piece within said intake chamber spaced between and co-operating with adjacent cylinders to form fuel mixture passages.

16. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, and a filler piece within said chamber between and cooperating with adjacent cylinders but free from contact therewith to form a fuel mixture passage.

17. An internal combustion engine of the sleeve valve type comprising in combination, a cylinder block having a plurality of aligned cylinders ported for intake and exhaust gases, means dividing a portion of the cylinder block longitudinally to form separate intake and exhaust chambers, means dividing the intake chamber centrally of the cylinder block into a pair of intake chamber portions respectively communicating with the intake ports of the groups of cylinders to each side of said intake chamber dividing means, and an intake manifold provided with a dividing wall forming an extension of the intake chamber dividing means, said intake manifold having branched portions respectively communicating with said intake chamber portions adjacent the said intake chamber dividing means.

18. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, and a filler piece within said chamber between and cooperating with adjacent cylinders but free from contact with one thereof to form a fuel mixture passage.

19. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, cylinder block means between adjacent cylinders forming a longitudinally extending dividing wall bounding said intake chamber, and a filler piece within said chamber between and cooperating with adjacent cylinders but free from contact with the said dividing wall thereby providing a fuel mixture passage between the dividing wall and the filler piece.

20. An internal combustion engine of the sleeve valve type comprising in combination, a cylinder block having a plurality of engine cylinders ported for passage of intake and exhaust gases, an intake chamber within the cylinder block communicating with the intake ports of a plurality of the cylinders, an intake manifold communicating with the intake chamber, cylinder block means between adjacent cylinders forming a longitudinally extending dividing wall bounding said intake chamber, and a filler piece within said chamber between and cooperating with adjacent cylinders but free from contact with the said dividing wall, and also free from contact with one of said adjacent cylinders.

In witness whereof, I hereunto subscribe my name this 27th day of January, A. D. 1928.

OSCAR C. KREIS.